US012804463B2

(12) United States Patent
Al-Mufti et al.

(10) Patent No.: US 12,804,463 B2
(45) Date of Patent: Nov. 17, 2026

(54) ENERGY SAVING USING RAN NETWORK FUNCTION MULTI-HOMING

(71) Applicant: DISH Wireless L.L.C., Englewood, CO (US)

(72) Inventors: Khalid Al-Mufti, Sterling, VA (US); Mehdi Alasti, Reston, VA (US); Siddhartha Chenumolu, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 340 days.

(21) Appl. No.: 18/642,313

(22) Filed: Apr. 22, 2024

(65) Prior Publication Data

US 2025/0330873 A1 Oct. 23, 2025

(51) Int. Cl.
*H04W 28/08* (2023.01)
*H04W 28/084* (2023.01)
*H04W 52/02* (2009.01)

(52) U.S. Cl.
CPC ..... *H04W 28/084* (2023.05); *H04W 28/0846* (2020.05); *H04W 52/0203* (2013.01)

(58) Field of Classification Search
CPC ........... H04W 28/084; H04W 28/0846; H04W 52/0203
See application file for complete search history.

(56) References Cited

U.S. PATENT DOCUMENTS 8,260,922 B1 * 9/2012 Aggarwal ............... H04L 45/24 709/239
8,724,456 B1 * 5/2014 Hong .................. G06F 11/3055 370/225
11,863,393 B1 1/2024 Padaki et al.
2016/0057658 A1 * 2/2016 Horn ................ H04W 28/0864 370/236
2021/0243613 A1 8/2021 Khanfouci et al.
2023/0345266 A1 10/2023 Casati

FOREIGN PATENT DOCUMENTS

CA 3032474 A1 * 8/2019 .......... H04W 72/543
WO 2023/049345 A1 3/2023

OTHER PUBLICATIONS

International search Report and written opinion received for PCT application No. PCT/US25/22747, mailed on Jul. 25, 2025, 11 pages.

* cited by examiner

*Primary Examiner* — Brenda H Pham
(74) *Attorney, Agent, or Firm* — Kipman T. Werking; Frontier IP Law PLLC

(57) ABSTRACT

A disclosed method may include (i) configuring multi-homing by assigning a first network function in a radio access network of a mobile network operator for telecommunication service to both a primary instance of a second and distinct network function in the radio access network and a secondary instance of the second and distinct network function in the radio access network, and (ii) determining, by a component of the radio access network of the mobile network operator for telecommunication service applying a multi-homing switching policy, that a level of load is sufficiently low such that a switch should be performed to switch from the primary instance of the second and distinct network function serving the first network function to the secondary instance of the second and distinct network function serving the first network function.

20 Claims, 11 Drawing Sheets

800

| Performance | | | Power | Performance to Power Ratio |
|---|---|---|---|---|
| Target Load | Actual Load | SSj_ops | Average Active Power (W) | |
| 100% | 98.2% | 5,386,401 | 385 | 13,982 |
| 90% | 90.2% | 4,943,361 | 347 | 14,234 |
| 80% | 80.0% | 4,389,486 | 306 | 14,341 |
| 70% | 70.1% | 3,843,150 | 269 | 14,304 |
| 60% | 60.0% | 3,289,702 | 235 | 14,002 |
| 50% | 50.0% | 2,740,492 | 205 | 13,366 |
| 40% | 40.1% | 2,196,364 | 179 | 12,295 |
| 30% | 30.0% | 1,642,466 | 154 | 10,695 |
| 20% | 20.0% | 1,097,528 | 129 | 8,483 |
| 10% | 10.0% | 547,494 | 106 | 5,157 |
| Active Idle | | 0 | 48.2 | 0 |
| | | | ΣSSj_ops/Σpower= | **12,727** |

*FIG. 8*

ENERGY SAVING USING RAN NETWORK FUNCTION MULTI-HOMING

BRIEF SUMMARY

This disclosure is generally directed to systems, methods, and computer-readable media relating to energy-saving using radio access network function multi-homing. Energy efficiency can be a key performance indicator in fifth generation, sixth generation, or beyond networks that are targeted to support diversified use cases. In some scenarios, both fifth generation and sixth generation technologies can exploit the disaggregated radio access network architecture. For example, fifth generation technology can target levels of energy efficiency that are ten times better than fourth generation technology.

With respect to fifth generation networks, in some configurations of radio units and respective distributed units, the various instances of distributed units are consuming significant amounts of energy. Accordingly, it can be desirable to develop more efficient implementations of the configurations between radio units and distributed units such that the energy consumed by the distributed units is reduced. More specifically, a goal can be to enhance the energy efficiency of distributed units and/or centralized units using one or more of the inventive concepts that are further outlined below.

In some examples, a method includes (i) configuring multi-homing by assigning a first network function in a radio access network of a mobile network operator for telecommunication service to both a primary instance of a second and distinct network function in the radio access network and a secondary instance of the second and distinct network function in the radio access network such that the primary instance of the second and distinct network function serves the first network function during a higher load scenario and the secondary instance of the second and distinct network function serves the first network function during a lower load scenario according to a multi-homing switching policy, (ii) determining, by a component of the radio access network of the mobile network operator for telecommunication service applying the multi-homing switching policy, that a level of load is sufficiently low such that a switch should be performed to switch from the primary instance of the second and distinct network function serving the first network function to the secondary instance of the second and distinct network function serving the first network function, and (iii) switching, by the component of the radio access network of the mobile network operator for telecommunication service in response to determining that the level of load is sufficiently low, from the primary instance of the second and distinct network function serving the first network function to the secondary instance of the second and distinct network function serving the first network function.

In some examples, the first network function comprises a radio unit while the second network function comprises a distributed unit.

In some examples, the first network function comprises a distributed unit while the second network function comprises a centralized unit.

In some examples, the secondary instance of the second and distinct network function comprises a shared network function that multiple instances of the first network function share during the lower load scenario according to the multi-homing switching policy.

In some examples, the method further includes switching, by the component of the radio access network of the mobile network operator for telecommunication service in response to determining that the level of load is sufficiently low, the primary instance of the second and distinct network function to idle.

In some examples, switching, by the component of the radio access network of the mobile network operator for telecommunication service in response to determining that the level of load is sufficiently low, the primary instance of the second and distinct network function to idle eliminates, at the primary instance of the second and distinct network function, static energy consumption that is independent of the load.

In some examples, determining, by the component of the radio access network of the mobile network operator for telecommunication service applying the multi-homing switching policy, that the level of load is sufficiently low such that the switch should be performed to switch from the primary instance of the second and distinct network function serving the first network function to the secondary instance of the second and distinct network function serving the first network function comprises determining that a current time or date is associated with the lower load scenario according to the multi-homing switching policy.

In some examples, determining, by the component of the radio access network of the mobile network operator for telecommunication service applying the multi-homing switching policy, that the level of load is sufficiently low such that the switch should be performed to switch from the primary instance of the second and distinct network function serving the first network function to the secondary instance of the second and distinct network function serving the first network function is performed according to a state transition diagram.

In some examples, the state transition diagram specifies that the level of load is sufficiently low in response to detecting that a primary level of load at the primary instance of the second and distinct network function is below a first threshold level.

In some examples, the state transition diagram specifies a switch back to the higher load scenario according to the multi-homing switching policy in response to detecting that an instant measurement of a secondary level of load at the secondary instance of the secondary and distinct network function is greater than a third threshold level.

In some examples, the first threshold level is lower than the third threshold level.

In some examples, the state transition diagram specifies a switch back to the higher load scenario according to the multi-homing switching policy in response to detecting that an instant measurement of a secondary level of load at the secondary instance of the secondary and distinct network function is greater than a third threshold level.

In some examples, the state transition diagram specifies a switch back to the higher load scenario according to the multi-homing switching policy in response to detecting that a smoothed, averaged, or predicted measurement of a secondary level of load at the secondary instance of the secondary and distinct network function is greater than a second threshold level.

In some examples, the second threshold level is lower than the third threshold level.

In some examples, the state transition diagram specifies a switch back to the higher load scenario according to the multi-homing switching policy in response to detecting that a smoothed, averaged, or predicted measurement of a secondary level of load at the secondary instance of the secondary and distinct network function is greater than a second threshold level.

In some examples, the component of the radio access network of the mobile network operator for telecommunication service applying the multi-homing switching policy comprises a service management and orchestration function.

In some examples, the component of the radio access network of the mobile network operator for telecommunication service applying the multi-homing switching policy comprises a non-real-time radio intelligent controller hosted within the service management and orchestration function.

In some examples, a system comprises at least one physical computing processor of a computing device and a non-transitory computer-readable medium that has instructions stored thereon that, when executed by the at least one physical computing processor, cause the computing device to perform operations comprising: (i) configuring multi-homing by assigning a first network function in a radio access network of a mobile network operator for telecommunication service to both a primary instance of a second and distinct network function in the radio access network and a secondary instance of the second and distinct network function in the radio access network such that the primary instance of the second and distinct network function serves the first network function during a higher load scenario and the secondary instance of the second and distinct network function serves the first network function during a lower load scenario according to a multi-homing switching policy, (ii) determining, by a component of the radio access network of the mobile network operator for telecommunication service applying the multi-homing switching policy, that a level of load is sufficiently low such that a switch should be performed to switch from the primary instance of the second and distinct network function serving the first network function to the secondary instance of the second and distinct network function serving the first network function, and (iii) switching, by the component of the radio access network of the mobile network operator for telecommunication service in response to determining that the level of load is sufficiently low, from the primary instance of the second and distinct network function serving the first network function to the secondary instance of the second and distinct network function serving the first network function.

In some examples, a non-transitory computer-readable medium has instructions stored thereon that, when executed by at least one physical computing processor, cause a computing device to perform operations comprising: (i) configuring multi-homing by assigning a first network function in a radio access network of a mobile network operator for telecommunication service to both a primary instance of a second and distinct network function in the radio access network and a secondary instance of the second and distinct network function in the radio access network such that the primary instance of the second and distinct network function serves the first network function during a higher load scenario and the secondary instance of the second and distinct network function serves the first network function during a lower load scenario according to a multi-homing switching policy, (ii) determining, by a component of the radio access network of the mobile network operator for telecommunication service applying the multi-homing switching policy, that a level of load is sufficiently low such that a switch should be performed to switch from the primary instance of the second and distinct network function serving the first network function to the secondary instance of the second and distinct network function serving the first network function, (iii) switching, by the component of the radio access network of the mobile network operator for telecommunication service in response to determining that the level of load is sufficiently low, from the primary instance of the second and distinct network function serving the first network function to the secondary instance of the second and distinct network function serving the first network function.

BRIEF DESCRIPTION OF THE DRAWINGS

For a better understanding of the present invention, reference will be made to the following Detailed Description, which is to be read in association with the accompanying drawings:

FIG. 8 shows a table of correlations between various metrics including a target load, an actual load, a number of operations, an average of active power, and a performance to power ratio.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
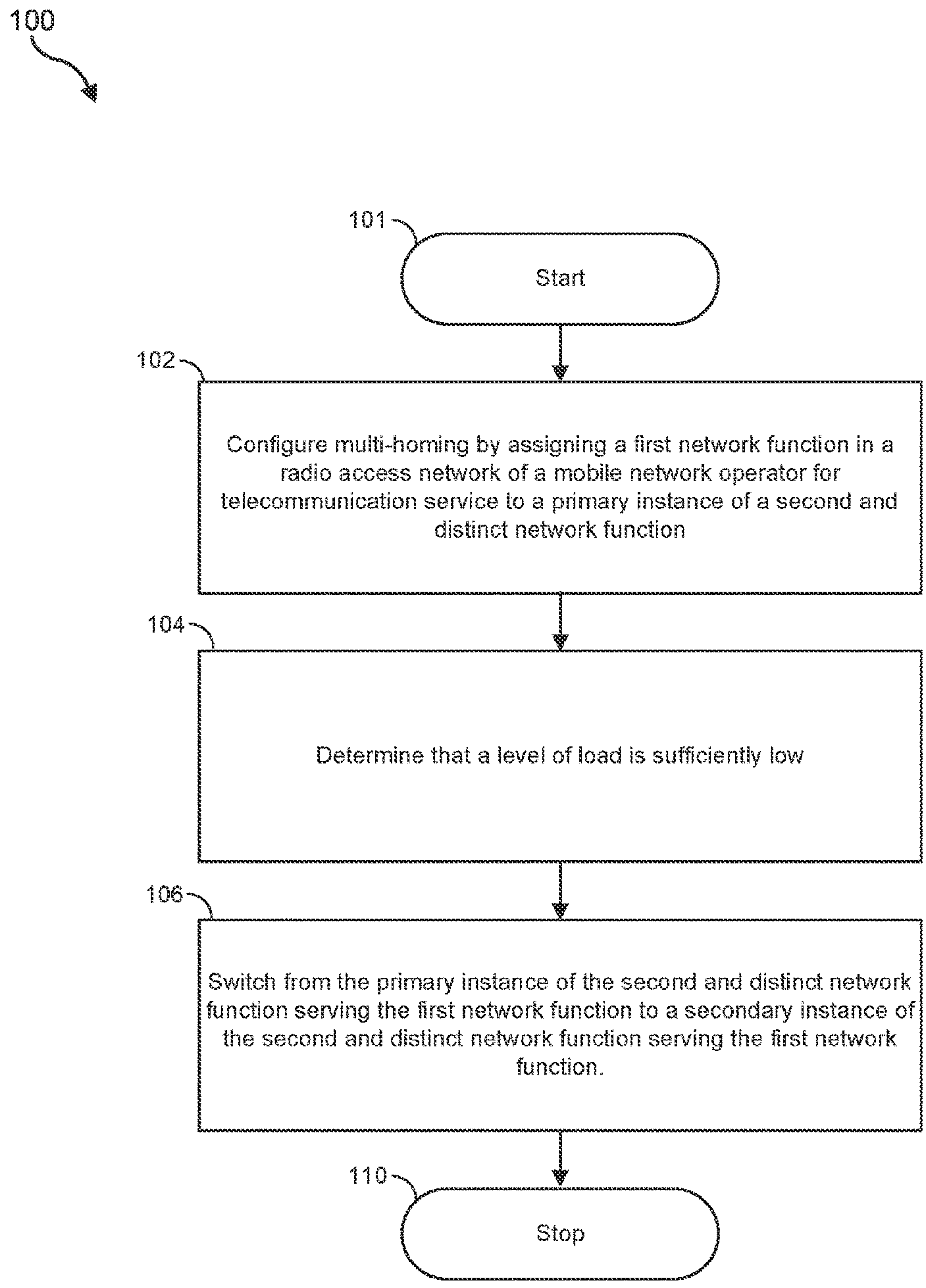
FIG. 1 shows a flow diagram for a method relating to energy saving using network function multi-homing in a radio access network.

FIG. 1 shows a flow diagram for a method 100 relating to energy saving using network function multi-homing in a radio access network. At step 101, method 100 may start or begin. At step 102, method 100 may include configuring multi-homing by assigning a first network function in a radio access network of a mobile network operator for telecommunication service to both a primary instance of a second and distinct network function in the radio access network and a secondary instance of the second and distinct network function in the radio access network such that the primary instance of the second and distinct network function serves the first network function during a higher load scenario and the secondary instance of the second and distinct network function serves the first network function during a lower load scenario according to a multi-homing switching policy. At step 104, method 100 may include determining, by a component of the radio access network of the mobile network operator for telecommunication service applying the multi-homing switching policy, that a level of load is sufficiently low such that a switch should be performed to switch from the primary instance of the second and distinct network function serving the first network function to the secondary instance of the second and distinct network function serving the first network function. At step 106, method 100 may include switching, by the component of the radio access network of the mobile network operator for telecommunication service in response to determining that the level of load is sufficiently low, from the primary instance of the second and distinct network function serving the first network function to the secondary instance of the second and distinct network function serving the first network function.

As used herein, the phrase "multi-homing" can generally refer to multiple network functions or instances of network functions "homing in," or being served by, the same instance of a network function such that the multiple network functions effectively share the same instance of the network function that they are homing in. In other words, multi-homing effectively moves the loads from different network functions onto a single network function. Multi-homing can be used for multiple distinct purposes, including geo-redundancy and including the energy-saving goals described within this disclosure. The phrase "multi-homing" can generally be used within this disclosure in a manner that is consistent with the discussion below of the figures and consistent with the usage of those having skill in the art. Similarly, this disclosure can refer to one network function "homing in" or "homing on" a second and distinct network function, according to multi-homing, in the sense that the second and distinct network function is assigned to, or is serving, the first network function. Accordingly, the first network function can switch from homing in a primary instance of a second and distinct network function to homing in a secondary instance of the second and distinct network function according to a multi-homing switching policy. As used herein, the term "multi-homing switching policy" can generally refer to a policy that specifies when one network function should switch from homing in a primary network function to homing in a secondary network function, as discussed further below. In some examples, the multi-homing switching policy can specify or indicate a state transition diagram, as discussed in more detail below in connection with FIG. 5.

As used herein, the phrase "radio access network of a mobile network operator for telecommunication service" can generally refer to a radio access network that a mobile network operator maintains or administers to provide telecommunication services to corresponding clients or customers and according to a fifth generation, sixth generation, or beyond configuration. As used herein, the term "component of the radio access network" can generally refer to any suitable component or network function on the radio access network performing the corresponding action, step, or feature. In some illustrative examples, the component of the radio access network includes a service management and orchestration function. In further examples, the component of the radio access network includes a non-real-time radio intelligent controller hosted within the service management and orchestration function.

Figure 2:
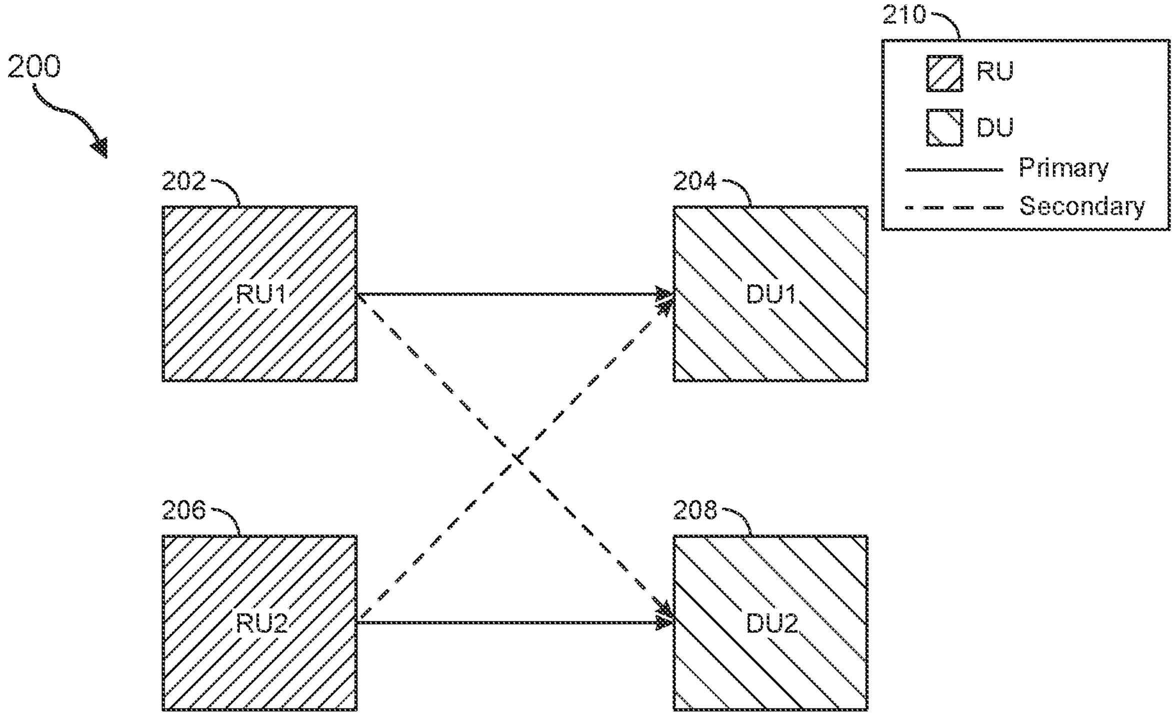
FIG. 2 shows a diagram of radio units assigned to respective primary and secondary distributed units according to a multi-homing switching policy prior to a corresponding switch from a primary distributed unit serving a specific radio unit to a secondary distributed unit serving the specific radio unit.

FIG. 2 shows a diagram 200 of radio units assigned to respective primary and secondary distributed units according to a multi-homing switching policy prior to a corresponding switch from a primary distributed unit serving a specific radio unit to a secondary distributed unit serving the specific radio unit. In particular, diagram 200 shows a radio unit 202 and a radio unit 206. Radio unit 202 is assigned to a distributed unit 204 where distributed unit 204 can correspond to the primary instance of the second and distinct network function of method 100 for radio unit 202. Radio unit 206 is assigned to a distributed unit 208 where distributed unit 208 can correspond to the primary instance of the second and distinct network function of method 100 for radio unit 206. Similarly, radio unit 202 is assigned to distributed unit 208 as the secondary instance of the second and distinct network function of method 100 for radio unit 202. In parallel, radio unit 206 is assigned to distributed unit 204 as the secondary instance of the second and distinct network function of method 100. A legend 210 within diagram 200 indicates the respective types of network functions shown within this diagram, and this legend further indicates the types of relationships or assignments between respective radio units and respective distributed units, as shown, and as discussed further below.

Diagram 200 indicates a state of the network prior to the corresponding switch and the activation of multi-homing that was previously set up. Accordingly, within diagram 200, both distributed unit 204 and distributed unit 208 remain active. Moreover, although secondary relationships according to the multi-homing switching policy have been established, as indicated by the diagonal dashed lines within diagram 200, these relationships have not yet been activated or utilized.

In the example of diagram 200, the first network function of method 100 includes a radio unit while the second network function includes a distributed unit. Additionally, or alternatively, in other examples, the first network function of method 100 can include a distributed unit while the second network function includes a centralized unit, as understood by those having skill in the art and consistent with the discussion of FIGS. 4 and 10, for example.

As understood by those having skill in the art, network functions can generally consume dynamic energy that is dependent on a size of load and static energy that is independent of the size of load. Accordingly, prior to the switch and prior to activation of multi-homing, distributed unit 204 will consume both dynamic energy (E1_d) and static energy (E_s, where E_s is the same for all distributed units) and distributed unit 208 will consume both dynamic energy (E2_d) and static energy (E_s) such that the total amount of energy consumption by distributed unit 204 and distributed unit 208 can be specified as E1_d+E2_d+2*E_s.

Figure 3:
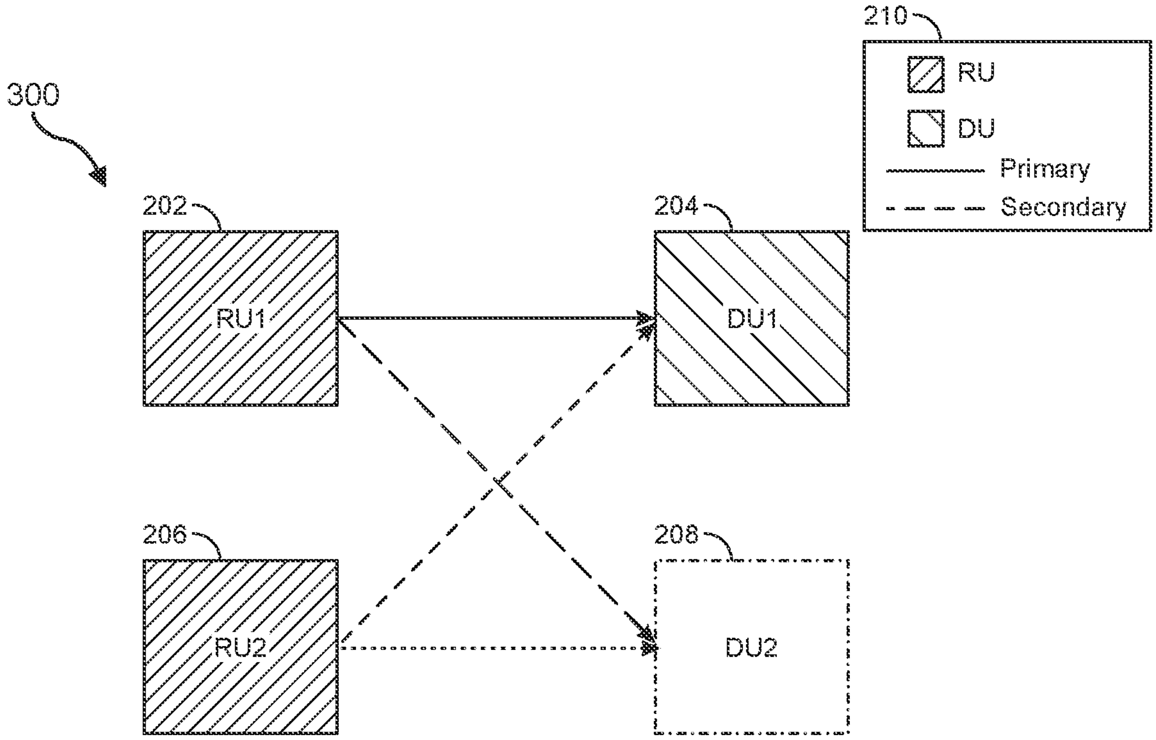
FIG. 3 shows a diagram of radio units assigned to respective primary and secondary distributed units according to the multi-homing switching policy after the corresponding switch from the primary distributed unit serving the specific radio unit to the secondary distributed unit serving the specific radio unit.

FIG. 3 shows a diagram 300 of radio units assigned to respective primary and secondary distributed units according to the multi-homing switching policy after the corresponding switch from the primary distributed unit serving the specific radio unit to the secondary distributed unit serving the specific radio unit. Accordingly, in diagram 300 distributed unit 204, as the primary instance of the second and distinct network function, now continues to serve radio unit 202 while distributed unit 204, as the secondary instance of the second and distinct network function, also continues to serve radio unit 206. Accordingly, the previously established multi-homing configuration has been activated such that both radio unit 202 and radio unit 206 home in distributed unit 204.

In view of the above, distributed unit 208 has been switched to idle, as indicated by diagram 300 showing distributed unit 208 with dashed lines. In other words, method 100 can further include switching, by the component of the radio access network of the mobile network operator for telecommunication service in response to determining that the level of load is sufficiently low, the primary instance of the second and distinct network function to idle. In this configuration, switching, by the component of the radio access network of the mobile network operator for telecommunication service in response to determining that the level of load is sufficiently low, the primary instance of the second and distinct network function to idle eliminates, at the primary instance of the second and distinct network function, static energy consumption that is independent of the load.

With respect to the discussion above of dynamic energy and static energy consumption, the switching of distributed unit 208 to idle eliminates its static energy consumption. Simultaneously, the adoption of radio unit 206 by distributed unit 204 according to multi-homing results in distributed unit 204 consuming dynamic energy for both radio unit 202 (E1_d) and also radio unit 206 (E2_d, which was previously consumed by distributed unit 208). Accordingly, the total amount of energy consumption by distributed unit 204 and distribute unit 208 in diagram 300 can be specified as E1_d+E2_d+E_s. Consequently, those having skill in the art can compare diagram 300 with diagram 200, and can further compare their equations above for total energy consumption, to ascertain that the configuration of diagram 300 utilizing multi-homing has reduced energy consumption by E_s due to the switching of distributed unit 208 to idle.

The switch from diagram 200 to diagram 300 can be performed in response to detecting a low load scenario according to a multi-homing switching policy. The multi-homing switching policy can specify a threshold level of load below which the low load scenario is detected. The threshold level of load may be compared against a level of load at the primary instance of the second and distinct network function such as distributed unit 204 in diagram 200 and diagram 300. Additionally, or alternatively, the threshold level of load may be compared against a level of load at any suitable permutation of network function instances configured according to the multi-homing switching policy. In the example of diagram 200 and diagram 300, the permutation of network functions may include one or more of radio unit 202, radio unit 206, distributed unit 204, and/or distributed unit 208, for example. In one specific example, the permutation of network functions may include both distributed unit 204 and distributed unit 208. Additionally, or alternatively, in other examples the threshold level of load may be compared against the level of load at any suitable permutation of distributed units and/or centralized units, in a manner that parallels the discussions of diagram 200 and diagram 300 above.

Diagram 300 helps to illustrate how, after performance of the switch according to the multi-homing switching policy, the secondary instance of the second and distinct network function includes a shared network function that multiple instances of the first network function share during the lower load scenario according to the multi-homing switching policy. In particular, distributed unit 204 can correspond to a shared network function that multiple instances of the radio unit, including radio unit 202 and radio unit 206, share during the lower load scenario according to the multi-homing switching policy.

In some examples, determining, by the component of the radio access network of the mobile network operator for telecommunication service applying the multi-homing switching policy, that the level of load is sufficiently low such that the switch should be performed to switch from the primary instance of the second and distinct network function serving the first network function to the secondary instance of the second and distinct network function serving the first network function can include determining that a current time or date is associated with the lower load scenario according to the multi-homing switching policy. In the context of a cellular telecommunication network, certain times of day and/or certain days of the week or year may be associated with lower load or higher load scenarios. By way of illustrative example, a majority of clients or customers may be sleeping during nighttime hours such that those nighttime hours become statistically associated with lower load scenarios. Similarly, in some examples, working hours during the workweek can become statistically associated with higher load scenarios due to organizations and employees communicating as part of business during working hours. Accordingly, in some examples the component of the radio access network can reference such statistical associations or patterns and activate multi-homing and the corresponding switch of method 100 when the statistical associations or patterns indicate a lower load scenario according to the multi-homing switching policy.

In summary, diagram 200 and diagram 300 illustrate how, during low load scenarios, one or more network functions will home on a secondary while their primaries will be switched to idle mode to save energy. Accordingly, the topology of the network can be changed (i.e., the number of active network functions produced) to further reduce energy consumption, and in particular to reduce static energy consumption. In other words, during a low load scenario, the technology of this location may effectively reduce the overall size of the radio access network.

Figure 4:
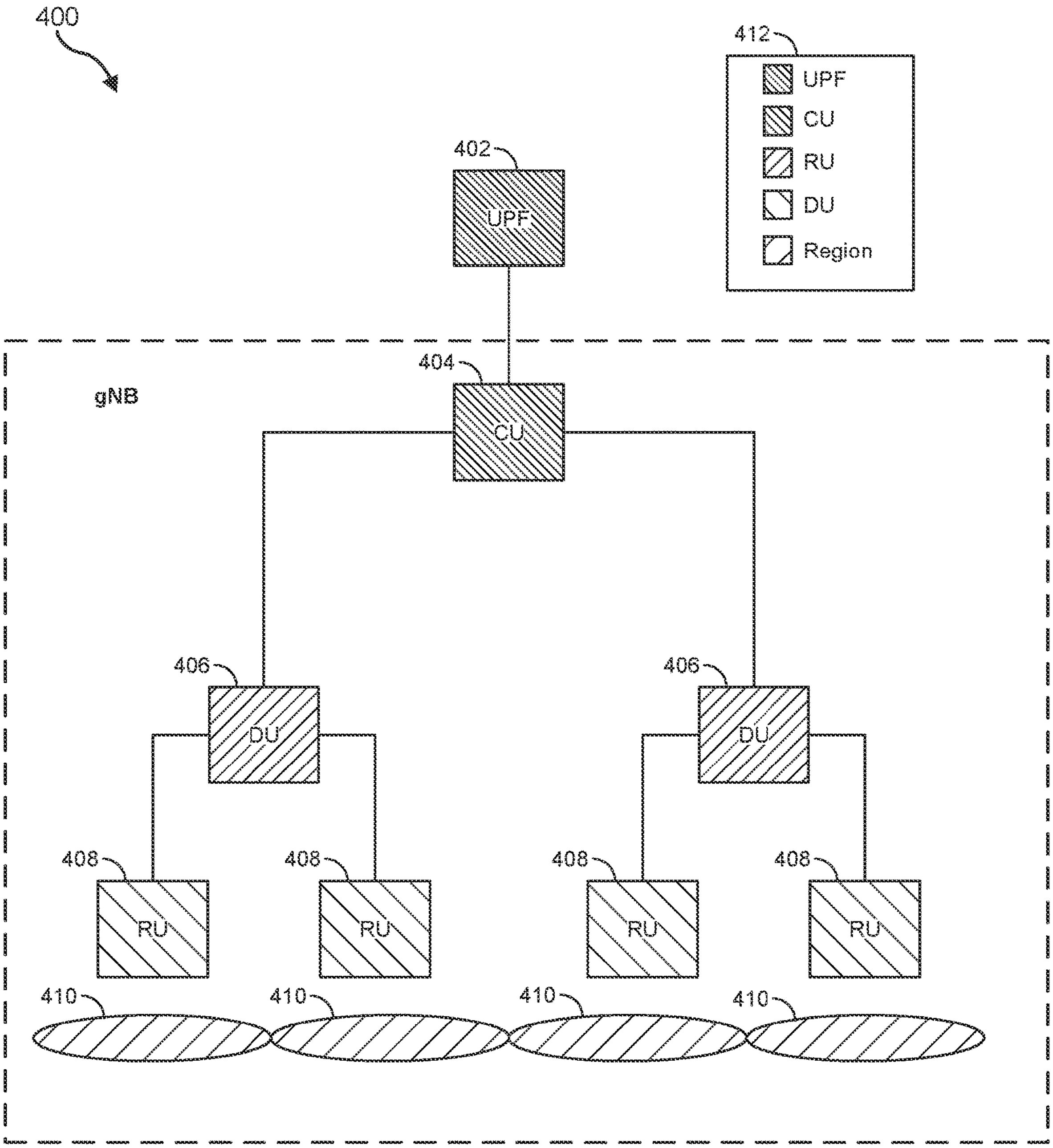
FIG. 4 shows a diagram of a radio access network of a mobile network operator for providing telecommunication service.

FIG. 4 shows a diagram 400 of a radio access network of a mobile network operator for providing telecommunication service. As shown, diagram 400 can include a legend 412 that specifies types of components within the corresponding network. These components can include a user plane function 402, a centralized unit 404, multiple instances of a distributed unit 406, multiple instances of a radio unit 408, and multiple instances of a region 410 that respectively correspond to the different instances of radio unit 408. Diagram 400 helps to illustrate how the network of method 100 may include a radio access network that features a disaggregated architecture. According to this disaggregated architecture, a single instance of a radio unit can cover a geographic area over a specified band. Moreover, diagram 400 also further illustrates how there can be a distance limitation between the various network functions of the radio access network. By way of illustrative example, a maximum distance allowed or tolerated between an instance of a radio unit and an instance of a distributed unit can be 30 km. These different aspects of the disaggregated architecture of the radio access network, as well as the corresponding distance limitations, will be discussed in more detail below in connection with FIG. 10.

Figure 5:
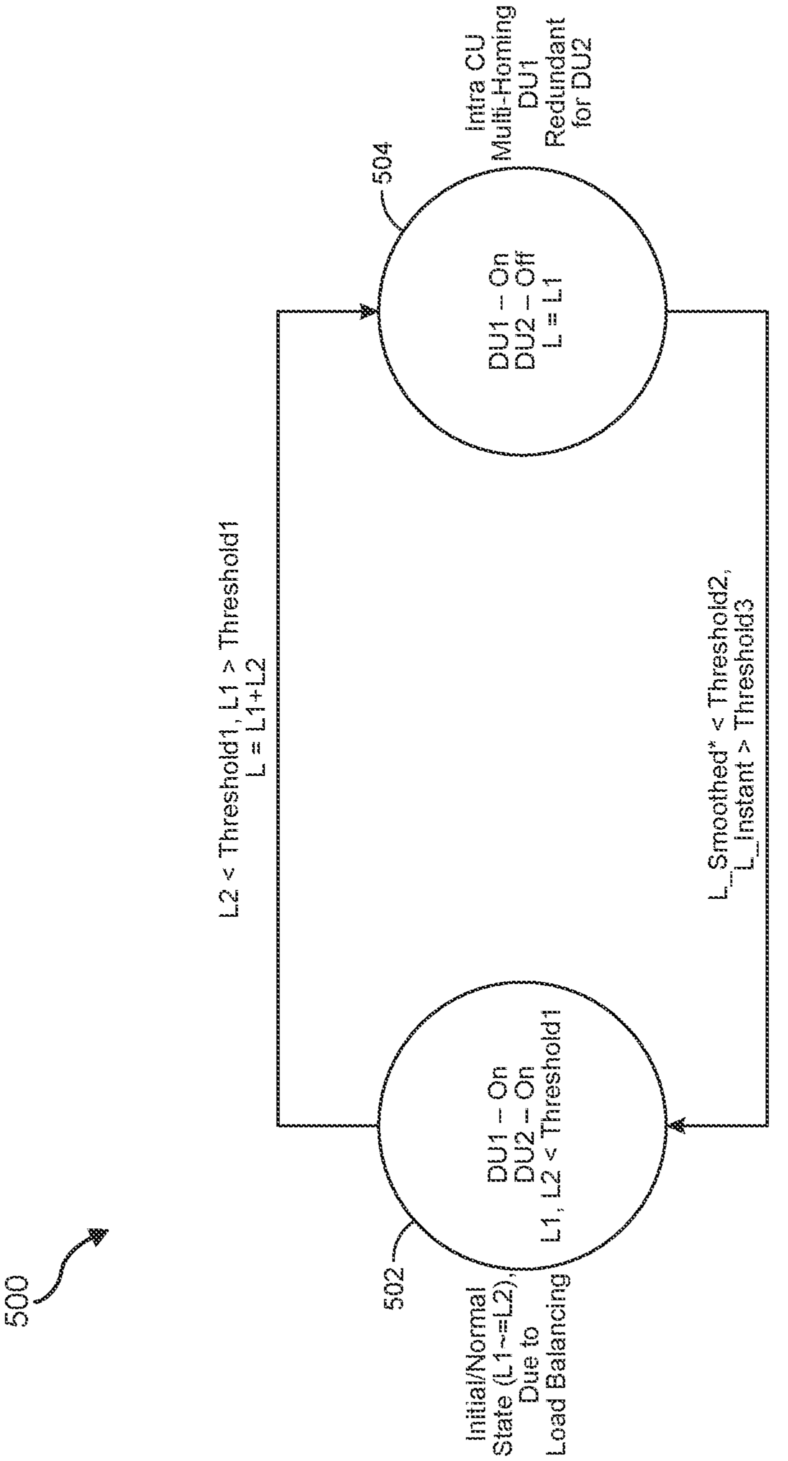
FIG. 5 shows a state diagram corresponding to a multi-homing switching policy for specifying when to perform a switch from a higher load scenario to a lower load scenario and vice versa.

FIG. 5 shows a state diagram 500 corresponding to a multi-homing switching policy for specifying when to perform a switch from a higher load scenario to a lower load scenario and vice versa. This figure helps to illustrate how method 100 may be performed according to state diagram 500. As shown within this figure, state diagram 500 can include two respective states corresponding to the two states that method 100 switches between, as further discussed above. In particular, a state 502 corresponds to an initial or normal state of state diagram 500. In contrast, a state 504 corresponds to a multi-homing state of state diagram 500. State diagram 500 further indicates how, at state 502, both instances of the distributed unit, such as distributed unit 204 and distributed unit 208, can be toggled on. Moreover, state diagram 500 further indicates that, at state 502, the level of load at either or both distributed unit can be below a first threshold. In contrast, state diagram 500 further indicates that, at state 504, the primary instance of the distributed unit such as distributed unit 208 has been toggled off. Accordingly, the combined level of load for both distributed units becomes effectively the same as the level of load at the secondary and remaining distributed unit, which can correspond to distributed unit 204. In this configuration, distributed unit 204 can consume the dynamic energy that was previously associated with distributed unit 208 prior to performing the switch of method 100. At the same time, switching distributed unit 208 to idle eliminates the consumption of static energy associated with active use of distributed unit 208.

State diagram 500 also further indicates the conditions for the state transitions between state 502 and state 504. In particular, a condition for transitioning from state 502 to state 504 can include the level of load at distributed unit 208, L2, being below the first threshold and/or the level of load at distributed unit 204, L1, being greater than the first threshold. With respect to the phrase "L2<Threshold1" in state diagram 500, the state transition diagram specifies that the level of load is sufficiently low in response to detecting that a primary level of load at the primary instance of the second and distinct network function is below a first threshold level. Additionally, or alternatively, with respect to the phrase "L1>Threshold1," the state diagram may require that, in order to perform the switch, the level of load at the secondary instance of the second and distinct network function is above the first threshold level. In other words, in the scenario of state diagram 500, because the level of load at distributed unit 208 is relatively low and the level of load at distributed unit 204 is relatively high, then an opportunity arises to switch distributed unit 208 to idle, thereby eliminating its static energy consumption (e.g., in state 504, the total load, L, is equal to L1, i.e. L=L1). Similarly, state diagram 500 indicates that the transition from state 504 to state 502 can be performed when a smoothed, averaged, or predicted measurement of the load at distributed unit 204 is greater than a second threshold and/or when an instant measurement of the load at distributed unit 204 is greater than a third threshold. With reference to method 100, in this example the state transition diagram specifies a switch back to the higher load scenario according to the multi-homing switching policy in response to detecting that an instant measurement of a secondary level of load at the secondary instance of the second and distinct network function is greater than a third threshold level. Optionally, the criterion to switch from state 502 to state 504 can be at the point in time when L2 is less than the first threshold (Threshold1) and L1 is greater than a fourth threshold (Threshold4), where Threshold4 is greater than Threshold1 such that the difference between Threshold1 and Threshold4 allows for the switch only when there is significant asymmetry between L1 and L2 (e.g., significant according to a threshold difference). This is further illustrated in the bottom diagram of FIG. 6.

With respect to state 504, in the example of state diagram 500 the measurement of load can be made at distributed unit 204 alone due to the fact that distributed unit 208 has been switched to idle (i.e., "DU2-Off" and "L=L1"). Series 600 of diagrams in FIG. 6 provide more detail and illustration regarding the first threshold, the second threshold, and the third threshold.

Figure 6:
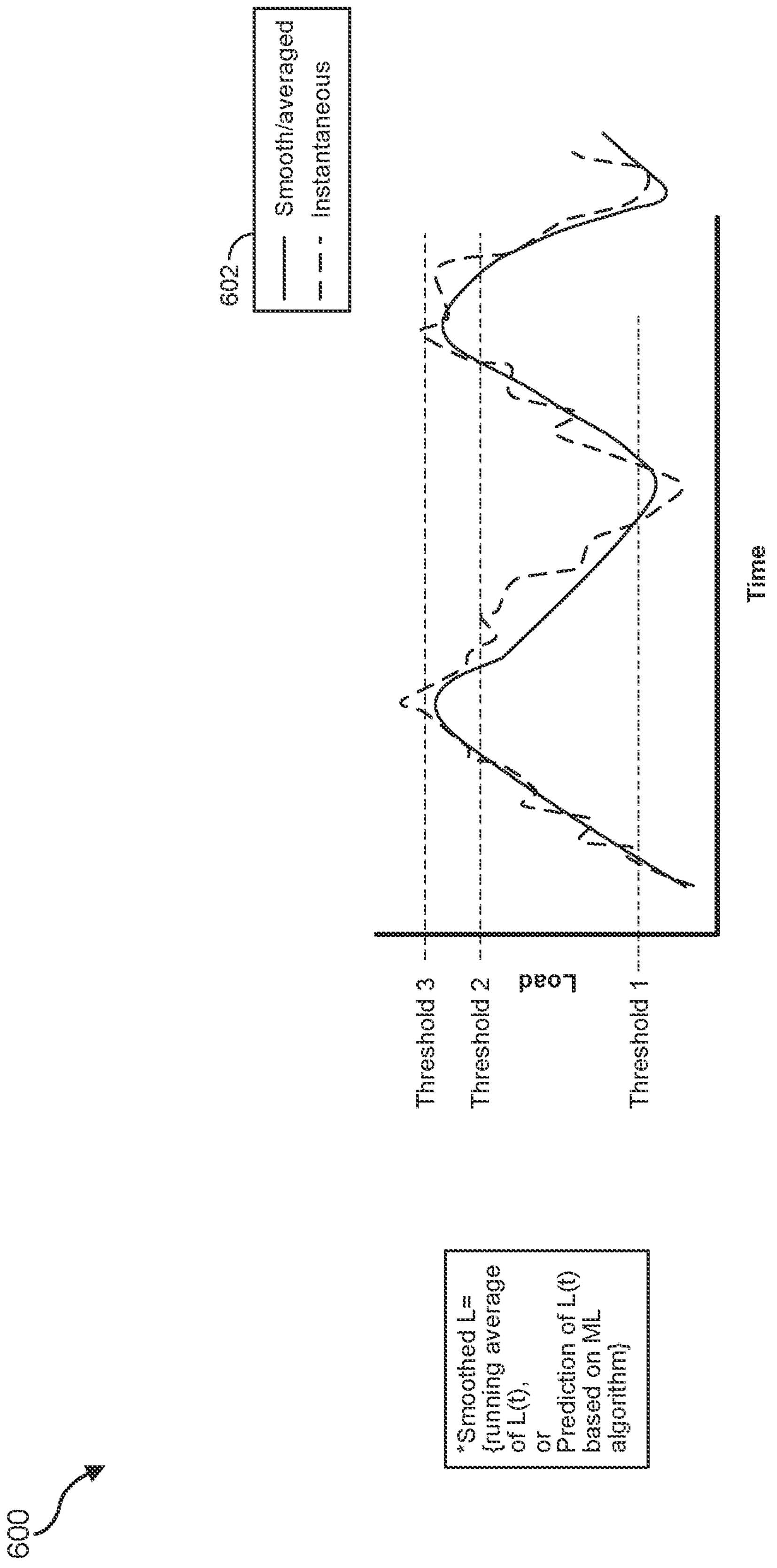
FIG. 6 shows a series of diagrams including a diagram showing instant measurements and smoothed, averaged, or predicted measurements of load over time.

FIG. 6 shows a series 600 of diagrams including a top diagram of L1 and L2 over time, where the switch can occur when L2 is less than the first threshold (Threhold1). Alternatively, the switch may occur when L2 is less than the first threshold (Threshold1) and L1 is greater than the fourth threshold (Threshold4). FIG. 6 shows a top diagram of instant measurements and smoothed, averaged, or predicted measurements of load (after the switch) over time. As discussed above in connection with diagram 500, the measurement of load along the vertical axis of the top diagram can refer to the measurement of load at the secondary instance of the second and distinct network function such as distributed unit 204, which serves as the secondary target for radio unit 206, as discussed above. Series 600 includes a legend 602 that identifies the two types of curves shown within the corresponding chart. A first curve corresponds to a smoothed, averaged, or predicted measurement of load (after the switch) at the secondary instance of the second and distinct network function such as distributed unit 204. Legend 602 indicates that this first curve is drawn using a straight and non-dashed line. A second curve corresponds to an instant or instantaneous measurement of load at the secondary instance of the second and distinct network function such as distributed unit 204. Legend 602 further indicates that the second curve is drawn using a dashed line.

Series 600 of diagrams also illustrates examples of the first threshold, the second threshold, the third threshold, and the fourth optional threshold that were discussed previously above in connection with diagram 500. Accordingly, diagram 500 and series 600 can be viewed and interpreted in conjunction with each other. In particular, at state 502, the level of load at both the primary instance and the secondary instance of the second and distinct network function can be above the first threshold. At the transition from state 502 toward state 504, the level of load at the primary instance of the second and distinct network function may be below the first threshold and/or the measurement of load at the secondary instance of the second and distinct network function may be greater than the first threshold. Similarly, to transition from state 504 toward state 502, the smoothed, averaged, or predicted measurement of load at the secondary instance of the second and distinct network function may be greater than the second threshold. Additionally, or alternatively, the instant measurement of load at the secondary instance of the second and distinct network function may be greater than the third threshold.

Figure 7:
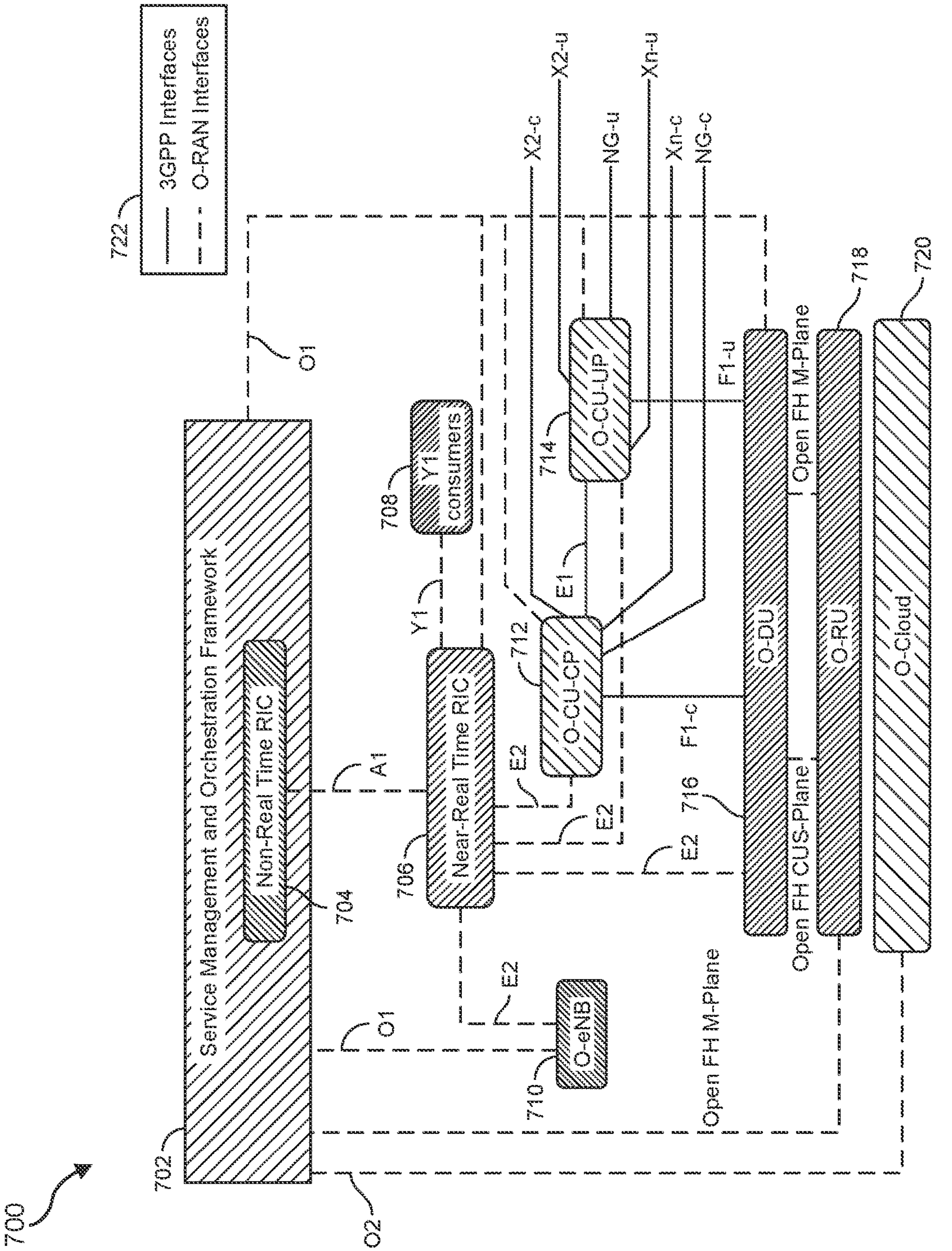
FIG. 7 shows a diagram of a radio access network intelligent controller configured with a remainder of the radio access network.

FIG. 7 shows a diagram 700 of a radio access network intelligent controller configured with a remainder of the radio access network. In particular, diagram 700 includes a service management and orchestration framework 702, which can include a non-real-time radio intelligent controller 704. Service management and orchestration framework 702 can interface with a distributed unit 716, a radio unit 718, and a cloud component 720. Diagram 700 also further illustrates how the above components may further interface with a near-real-time radio intelligent controller 706, Y1 consumers, an evolved node 710 associated with fourth-generation technology, a centralized unit control plane 712, and a centralized unit user plane 714, as shown. In various examples of method 100, the component of the radio access network of the mobile network operator for telecommunication service applying the multi-homing switching policy includes a service management and orchestration function such as service management and orchestration framework 702. In more specific examples of method 100, the component of the radio access network of the mobile network operator for telecommunication service applying the multi-homing switching policy comprises a non-real-time radio intelligent controller hosted within the service management and orchestration function, such as non-real-time radio intelligent controller 704. Additionally, or alternatively, in other examples the component of the radio access network may include a control unit that pushes one or more network functions to idle mode and/or a geo-redundancy subsystem that migrates one or more services from the idled network functions to one or more remaining active network functions.

FIG. 8 shows a table 800 of correlations between various metrics including a target load, an actual load, a number of operations, an average of active power, and a performance to power ratio. The component of the radio access network can reference a table such as table 800 when determining whether to trigger the switch of method 100. The following provides a discussion of two illustrative examples for how the component of the radio access network can use table 800 to determine whether to trigger the switch of method 100. In a first illustrative example, the primary instance of the second and distinct network function such as distributed unit 208 can experience actual loading of 10%. By referencing table 800, the component of the radio access network such as the non-real-time radio intelligent controller can estimate that the power consumption for this primary instance of the second and distinct network function is 106 W. In contrast, the secondary instance of the second and distinct network function, such as distributed unit 204, can experience loading of 40%, which the component of the radio access network estimates as consuming 179 W. Accordingly, the component of the radio access network can take the combined percentage of loading at 50% (10%+40%) and then reference table 800 to further estimate the combined power consumption at 205W. In view these calculations, the component of the radio access network can determine the power saving as: Saved Power=(Primary Power+Secondary Power)−Secondary with Combined Traffic Power, which in this example would translate into Saved Power=(106 W+179 W)−205 W=80 W. Accordingly, in this example the component of the radio access network can decide to perform the switch of method 100 based on the estimated power saving of 80W.

In contrast, in a second example for illustrative purposes, the primary instance of the second and distinct network function may be experiencing actual loading of 40%. The component of the radio access network can reference table 800 to estimate that power consumption at the primary instance of the second and distinct network function is 179 W. The secondary instance of the second and distinct network function such as distributed unit 204 may be experiencing loading of 50%, which the component of the radio access network estimates as consuming 205 W. Moreover, the component of the radio access network can estimate the combined percentage of 90% loading (40%+50%) as consuming 347 W. In view of these calculations, the component of the radio access network can determine the power saving as: Saved Power=(Primary Power+Secondary Power)−Secondary with Combined Traffic Power, which in this example would translate into Saved Power=(179 W+205 W)−347 W=37 W. In this example, the component of the radio access network such as the non-real-time radio intelligent controller can determine to not perform the switch of method 100 based on the estimated power savings of only 37 W, which may be insufficiently high to justify the risk of overloading the secondary instance of the second and distinct network function such as distributed unit 204. In various examples, the component of the radio access network can determine whether the saved power is sufficiently high by performing a comparison operation with respect to a threshold established by the network and/or mobile network operator. For example, a threshold of 50 W would justify the decision to perform the switch of method 100 in the first example of the preceding paragraph (i.e., because 80 W>50 W) while also justifying the decision to not perform the switch of method 100 in the second example of this paragraph (i.e., because 37 W<50 W).

Figure 9:
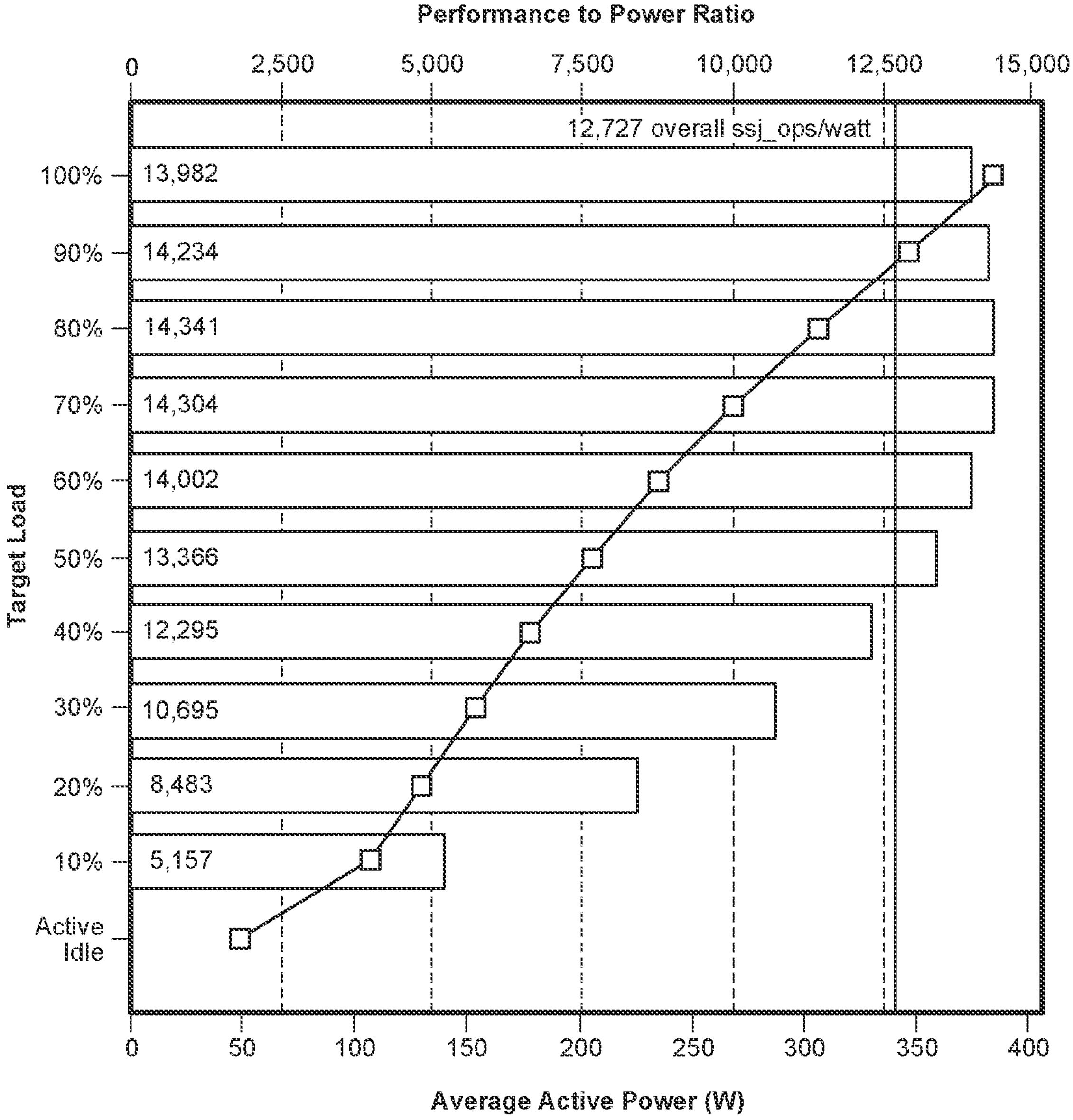
FIG. 9 shows a chart indicating a performance to power ratio between target load and a measurement of average active power.

For convenient reference by the reader, FIG. 9 also shows a chart 900 indicating a performance to power ratio between target load and a measurement of average active power. Chart 900 effectively plots on a two-dimensional chart the target load values and average active power values from diagram 800, as further discussed above.

Figure 10:
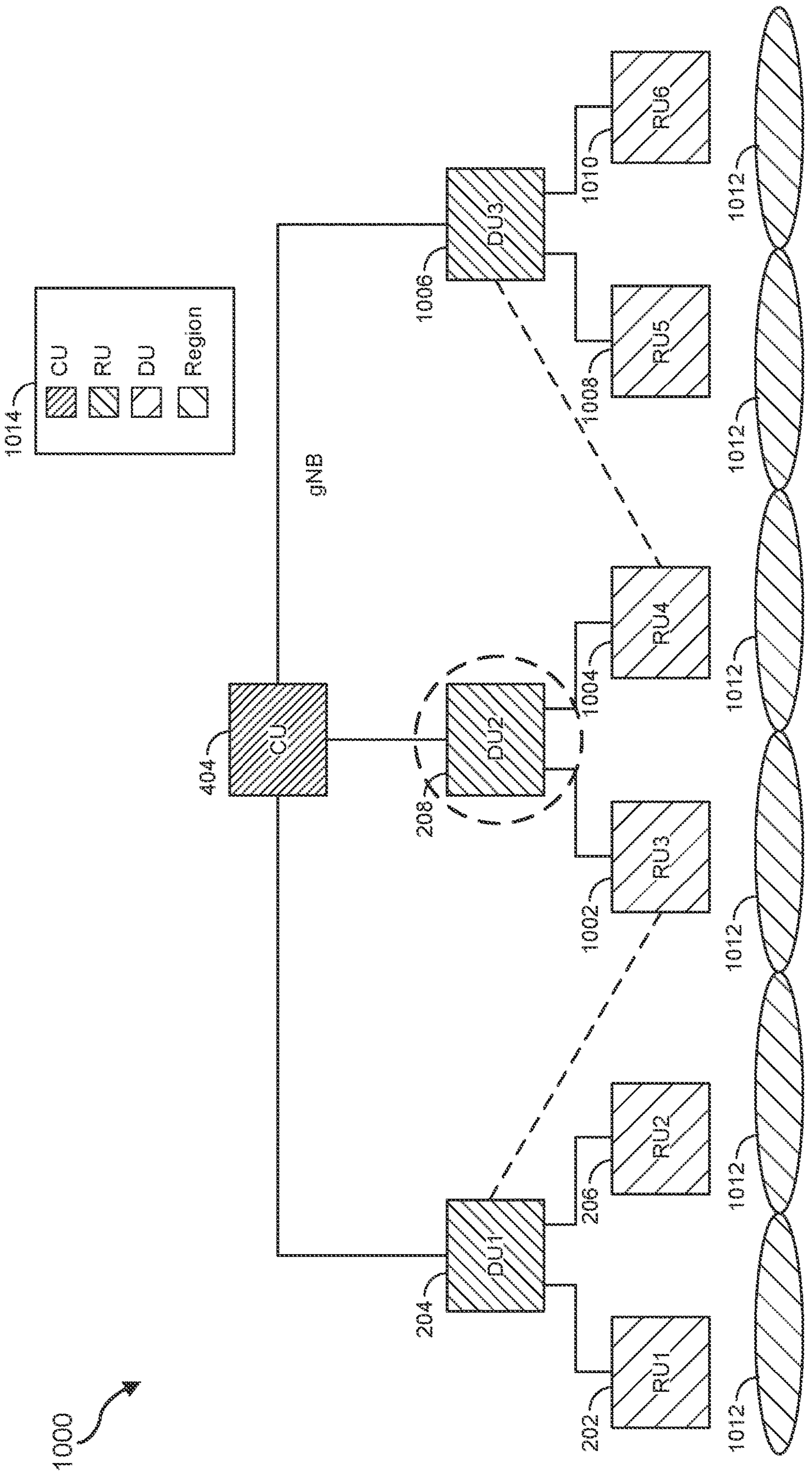
FIG. 10 shows a diagram indicating how a multi-homing switching policy can be applied in the context of the radio access network with respect to distance limitations between different types of network functions.

FIG. 10 shows a diagram 1000 indicating how a multi-homing switching policy can be applied in the context of the radio access network with respect to distance limitations between different types of network functions. In particular, diagram 1000 includes a centralized unit 404, distributed unit 204, distributed unit 208, a distributed unit 1006, radio unit 202, radio unit 206, a radio unit 1002, a radio unit 1004, a radio unit 1008, and a radio unit 1010, as well as several instances of a region 1012, which correspond to respective radio units, as shown. A legend 1014 helps to illustrate the different types of network functions and regions included within diagram 1000.

Diagram 1000 helps to illustrate how geographic limitations may inform the decision of which instance of the second and distinct network function to assign as the secondary instance to a first network function according to the multi-homing switching policy. In the example of diagram 1000, the radio unit may correspond to the first network function and the distributed unit may correspond to the second and distinct network function. Accordingly, radio unit 1002 and radio unit 1004 may be assigned to distributed unit 208 as the primary instance of the second and distinct network function. Nevertheless, in a low load scenario where the level of load at distributed unit 208 is measured or predicted to be low according to the multi-homing switching policy (or otherwise measured or predicted to satisfy the conditions for switching that are specified within the multi-homing switching policy), then it may be desirable to reroute traffic away from distributed unit 208 as the primary instance of the second and distinct network function to a different instance. Nevertheless, diagram 1000 illustrates how the different instances of the radio units are not equally distanced or separated from respective distributed units. Accordingly, in this example radio unit 1002 may be assigned to distributed unit 204 as the secondary instance of the second and distinct network function, because the distance between radio unit 1002 and distributed unit 204 is less than the 30 km geographic limitation between radio units and distributed units. In contrast, the distance between radio unit 1002 and distributed unit 1006 may be greater than 30 km such that this distance would violate the geographic limitation or constraint and distributed unit 1006 cannot serve as the secondary instance of the second and distinct network function for radio unit 1002. Similarly, radio unit 1004 may be assigned to distributed unit 1006 as the secondary instance of the second and distinct network function due to the distance between radio unit 1004 and distributed unit 1006 being less than 30 km, whereas the distance between radio unit 1004 and distributed unit 204 may violate the same 30 km geographic limitation that is discussed above. Moreover, although diagram 1000 focuses upon a scenario or configuration between radio units and respective distributed units, the same inventive concept applies in parallel to the configuration between distributed units and one or more respective centralized units by referencing the corresponding geographic limitation (e.g., 80 km). In summary, in the example of diagram 1000, radio unit 1002 homes in distributed unit 204 and radio unit 1004 homes in distributed unit 1006 during a low load scenario, whereas distributed unit 208 is switched to idle in this low load scenario.

In further examples, method 100 may be implemented through the O-RAN management plane ("M-Plane"). The management plane may operate according to a specification, such as version 11.0 of the O-RAN M-Plane specification. The specification may indicate that the management plane can include a "shared" radio unit feature (e.g., "Shared O-RU feature"), where a single radio unit can establish a Fronthaul and M-plane connection with multiple distributed units at the same time. The shared radio unit feature may enable multiple mobile network operators to share radio unit resources. In such scenarios, typically each operator will own a different distributed unit that is connected to the same radio unit, thus allowing each operator to configure its own component carrier on the shared radio unit.

In view of the above, this disclosure further describes and enables technology that can leverage and/or repurpose the shared radio unit feature to enable multi-homing of distributed units owned by the same mobile network operator. The mobile network operator may configure one distributed unit as the primary, which can be the distributed unit normally controlling the shared radio unit. The mobile network operator may also configure a component carrier on that radio unit. Furthermore, the mobile network operator may configure a second distributed unit as the secondary.

In the above examples, the service management and orchestration function in the radio access network architecture can manage or configure the primary and secondary distributed units. The service management and orchestration function can host the non-real-time radio intelligent controller where an application (e.g., "rApp") can be executed for energy conservation of the distributed units. The non-real-time radio intelligent controller can optimize energy efficiency of the distributed units by switching traffic from primary distributed units with low traffic to secondary distributed units that have more traffic while also switching the primary distributed units to idle, as further discussed above.

Additionally, or alternatively, the non-real-time radio intelligent controller may estimate the power consumption of the distributed unit by reading key performance indicators that indicate a percent loading of the distributed unit. The non-real-time radio intelligent controller may use the O1/E2 interface to read the percent loading of the distributed unit. The non-real-time radio intelligent controller may infer the power consumption by converting the present loading to a power consumption value. This may be performed by referencing percent-to-power mapping data and/or by the distributed unit providing such data upon initiation to the non-real-time radio intelligent controller.

As another alternative, the non-real-time radio intelligent controller may use the O1/E2 interface to read the traffic loading measurement from the distributed unit. The radio intelligent controller may use a pre-stored table, or a table sent from the distributed unit, to estimate the percent loading, and in turn the estimated power consumption of the distributed unit. By comparing the present loading and the corresponding power consumption of the primary and secondary distributed unit, the non-real-time radio intelligent controller can make a decision whether the primary distributed unit should be switched to idle and/or whether its traffic should be switched to the secondary distributed unit or not.

Consistent with the discussions of FIGS. 8-9, the non-real-time radio intelligent controller can estimate the new power consumption of the secondary distributed unit if the traffic from the primary is switched to the secondary distributed unit by using the same percent loading-to-power mapping or function with a combined percent loading of the primary and secondary distributed unit. The non-real-time radio intelligent controller may then determine if the estimated power consumption of the secondary distributed unit with combined traffic is less than the sum of the primary and secondary power consumption before any switching. If the answer to this decision step is yes, then the radio intelligent controller can switch the traffic to the secondary and switch the primary to idling. If the answer is no to this decision step, then the radio intelligent controller will not perform the switch and optionally can check again at a subsequent predetermined time. Alternatively, the radio intelligent controller may check whenever the primary percent loading drops below a predefined percentage such as 20%.

Additionally, or alternatively, in some examples method 100 may be performed according to an end-to-and energy consumption decision embodiment. In this embodiment, the end-to-end energy consumption of the distributed unit and radio unit in combination can be used as the metric for deciding whether to switch the primary distributed unit to the secondary distributed unit. Accordingly, the method described above in connection with FIGS. 8-9 can be expanded to include radio unit power consumption with carries activated in order to support traffic demands of the primary distributed unit and the secondary distributed unit according to the following formula:

E2EsavedPower=(PrimaryPowerDuAndRu+SecondaryPowerDuAndRu)−SecondaryWithCombinedTrafficPowerDuAndRu Where E2EsavedPower is the end-to-end saved power metric used by the radio intelligent controller.

Where PrimaryPowerDuAndRu is the end-to-end power consumption of the primary distributed unit and radio unit of the primary (not shared with the secondary distributed unit).

Where Secondary PowerDuAndRu is the end-to-end power consumption of the secondary distributed unit and radio unit of the secondary (not shared with the primary distributed unit).

And where Secondary WithCombinedTrafficPowerDuAndRu is the end-to-and energy consumption of the secondary distributed unit and radio unit with combined traffic or resource loading.

Optionally, the radio intelligent controller can skip the computation above, or if the computed end-to-end power saving is small, then the radio intelligent controller can switch to the secondary distributed unit and make end-to-and energy consumption measurements to compare the end-to-and energy consumption with the primary distributed unit. Moreover, in some examples, the radio intelligent controller can use statistics regarding energy consumption, such as mean or median end-to-and energy consumption.

Figure 11:
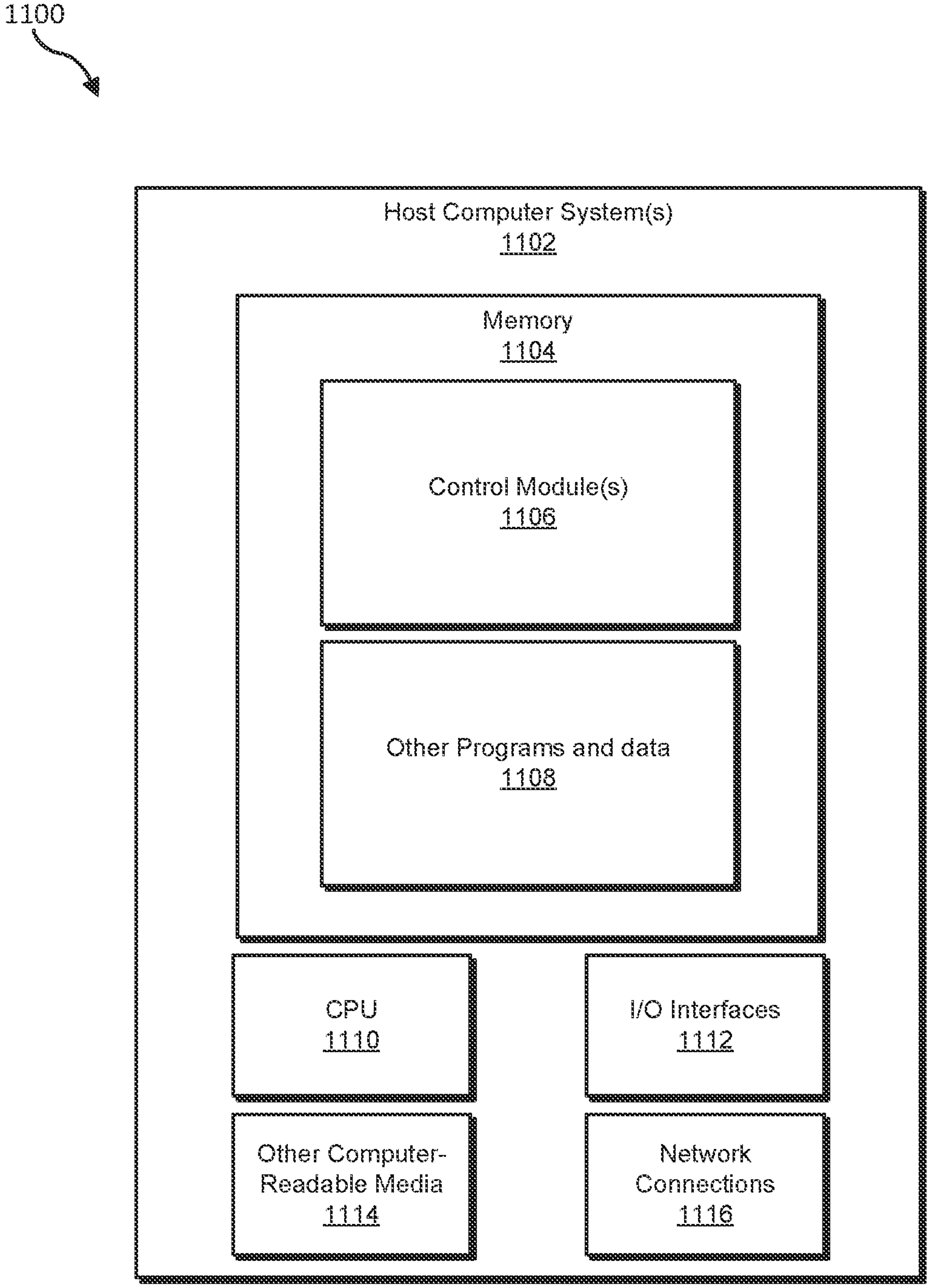
FIG. 11 shows a diagram of an example computing system that may facilitate the performance of one or more of the methods described herein.

FIG. 11 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 11 illustrates an example of underlying hardware on which such software and functionality may be hosted and/or implemented.

In particular, shown is example host computer system(s) 1101. For example, such computer system(s) 1101 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1101 may include memory 1102, one or more central processing units (CPUs) 1114, I/O interfaces 1118, other computer-readable media 1120, and network connections 1122.

Memory 1102 may include one or more various types of non-volatile and/or volatile storage technologies. Examples of memory 1102 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1102 may be utilized to store information, including computer-readable instructions that are utilized by CPU 1114 to perform actions, including those of embodiments described herein.

Memory 1102 may have stored thereon control module(s) 1104. The control module(s) 1104 may be configured to implement and/or perform some or all of the functions of the systems or components described herein. Memory 1102 may also store other programs and data 1110, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1122 are configured to communicate with other computing devices to facilitate the functionality described herein. In various embodiments, the network connections 1122 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1118 may include a video interface, other data input or output interfaces, or the like. Other computer-readable media 1120 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

configuring multi-homing by assigning a first network function in a radio access network of a mobile network operator for telecommunication service to both a primary instance of a second and distinct network function in the radio access network and a secondary instance of the second and distinct network function in the radio access network such that the primary instance of the second and distinct network function serves the first network function during a higher load scenario and the secondary instance of the second and distinct network function serves the first network function during a lower load scenario according to a multi-homing switching policy;

determining, by a component of the radio access network of the mobile network operator for telecommunication service applying the multi-homing switching policy, that a level of load is sufficiently low such that a switch should be performed to switch from the primary instance of the second and distinct network function serving the first network function to the secondary instance of the second and distinct network function serving the first network function; and switching, by the component of the radio access network of the mobile network operator for telecommunication service in response to determining that the level of load is sufficiently low, from the primary instance of the second and distinct network function serving the first network function to the secondary instance of the second and distinct network function serving the first network function.

2. The method of claim 1, wherein:

the first network function comprises a radio unit while the second network function comprises a distributed unit; or the first network function comprises a distributed unit while the second network function comprises a centralized unit.

3. The method of claim 1, wherein the secondary instance of the second and distinct network function comprises a shared network function that multiple instances of the first network function share during the lower load scenario according to the multi-homing switching policy.

4. The method of claim 1, further comprising switching, by the component of the radio access network of the mobile network operator for telecommunication service in response to determining that the level of load is sufficiently low, the primary instance of the second and distinct network function to idle.

5. The method of claim 4, wherein switching, by the component of the radio access network of the mobile network operator for telecommunication service in response to determining that the level of load is sufficiently low, the primary instance of the second and distinct network function to idle eliminates, at the primary instance of the second and distinct network function, static energy consumption that is independent of the load.

6. The method of claim 1, wherein determining, by the component of the radio access network of the mobile network operator for telecommunication service applying the multi-homing switching policy, that the level of load is sufficiently low such that the switch should be performed to switch from the primary instance of the second and distinct network function serving the first network function to the secondary instance of the second and distinct network function serving the first network function comprises determining that a current time or date is associated with the lower load scenario according to the multi-homing switching policy.

7. The method of claim 1, wherein determining, by the component of the radio access network of the mobile network operator for telecommunication service applying the multi-homing switching policy, that the level of load is sufficiently low such that the switch should be performed to switch from the primary instance of the second and distinct network function serving the first network function to the secondary instance of the second and distinct network function serving the first network function is performed according to a state transition diagram.

8. The method of claim 7, wherein the state transition diagram specifies that the level of load is sufficiently low in response to detecting that a primary level of load at the primary instance of the second and distinct network function is below a first threshold level.

9. The method of claim 8, wherein the state transition diagram specifies a switch back to the higher load scenario according to the multi-homing switching policy in response to detecting that an instant measurement of a secondary level of load at the secondary instance of the second and distinct network function is greater than a third threshold level.

10. The method of claim 9, wherein the first threshold level is lower than the third threshold level.

11. The method of claim 7, wherein the state transition diagram specifies a switch back to the higher load scenario according to the multi-homing switching policy in response to detecting that an instant measurement of a secondary level of load at the secondary instance of the second and distinct network function is greater than a third threshold level.

12. The method of claim 11, wherein the state transition diagram specifies a switch back to the higher load scenario according to the multi-homing switching policy in response to detecting that a smoothed, averaged, or predicted measurement of the secondary level of load at the secondary instance of the second and distinct network function is greater than a second threshold level.

13. The method of claim 12, wherein the second threshold level is lower than the third threshold level.

14. The method of claim 7, wherein the state transition diagram specifies a switch back to the higher load scenario according to the multi-homing switching policy in response to detecting that a smoothed, averaged, or predicted measurement of a secondary level of load at the secondary instance of the second and distinct network function is greater than a second threshold level.

15. The method of claim 7, wherein at least one threshold that is used to define a transition between states in the state transition diagram is extracted using a machine learning algorithm.

16. The method of claim 1, wherein the component of the radio access network of the mobile network operator for telecommunication service applying the multi-homing switching policy comprises a non-real-time radio intelligent controller hosted within a service management and orchestration function.

17. A system comprising:

at least one physical computing processor of a computing device; and a non-transitory computer-readable medium that has instructions stored thereon that, when executed by the at least one physical computing processor, cause the computing device to perform operations comprising:

configuring multi-homing by assigning a first network function in a radio access network of a mobile network operator for telecommunication service to both a primary instance of a second and distinct network function in the radio access network and a secondary instance of the second and distinct network function in the radio access network such that the primary instance of the second and distinct network function serves the first network function during a higher load scenario and the secondary instance of the second and distinct network function serves the first network function during a lower load scenario according to a multi-homing switching policy;

determining, by a component of the radio access network of the mobile network operator for telecommunication service applying the multi-homing switching policy, that a level of load is sufficiently low such that a switch should be performed to switch from the primary instance of the second and distinct network function serving the first network function to the secondary instance of the second and distinct network function serving the first network function; and switching, by the component of the radio access network of the mobile network operator for telecommunication service in response to determining that the level of load is sufficiently low, from the primary instance of the second and distinct network function serving the first network function to the secondary instance of the second and distinct network function serving the first network function.

18. The system of claim 17, wherein the first network function comprises a radio unit while the second network function comprises a distributed unit.

19. A non-transitory computer-readable medium that has instructions stored thereon that, when executed by at least one physical computing processor, cause a computing device to perform operations comprising:

configuring multi-homing by assigning a first network function in a radio access network of a mobile network operator for telecommunication service to both a primary instance of a second and distinct network function in the radio access network and a secondary instance of the second and distinct network function in the radio access network such that the primary instance of the second and distinct network function serves the first network function during a higher load scenario and the secondary instance of the second and distinct network function serves the first network function during a lower load scenario according to a multi-homing switching policy;

determining, by a component of the radio access network of the mobile network operator for telecommunication service applying the multi-homing switching policy, that a level of load is sufficiently low such that a switch should be performed to switch from the primary instance of the second and distinct network function serving the first network function to the secondary instance of the second and distinct network function serving the first network function; and switching, by the component of the radio access network of the mobile network operator for telecommunication service in response to determining that the level of load is sufficiently low, from the primary instance of the second and distinct network function serving the first network function to the secondary instance of the second and distinct network function serving the first network function.

20. The non-transitory computer-readable medium of claim 19, wherein the first network function comprises a radio unit while the second network function comprises a distributed unit.

* * * * *